United States Patent
Cha et al.

(10) Patent No.: US 9,645,477 B2
(45) Date of Patent: May 9, 2017

(54) POLARIZATION LED MODULE, AND LIGHTING DEVICE AND PROJECTOR HAVING THE SAME

(71) Applicant: SAMSUNG ELECTRONICS CO., LTD., Suwon-si (KR)

(72) Inventors: Yong-Dok Cha, Yongin-si (KR); Sung-tae Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

(21) Appl. No.: 14/625,251

(22) Filed: Feb. 18, 2015

(65) Prior Publication Data

US 2015/0234260 A1 Aug. 20, 2015

(30) Foreign Application Priority Data

Feb. 18, 2014 (KR) ........................ 10-2014-0018251

(51) Int. Cl.
G03B 21/20 (2006.01)
G03B 21/00 (2006.01)
G02B 5/30 (2006.01)

(52) U.S. Cl.
CPC ......... *G03B 21/006* (2013.01); *G02B 5/3016* (2013.01); *G03B 21/2033* (2013.01); *G03B 21/2073* (2013.01)

(58) Field of Classification Search
CPC . F21V 7/04; F21V 13/04; F21V 33/00; G03B 21/00; G03B 21/20; F21K 99/00; G02B 5/30
See application file for complete search history.

(56) References Cited

U.S. PATENT DOCUMENTS

| 7,434,945 B2 | 10/2008 | Maeda et al. |
| 7,445,340 B2 | 11/2008 | Conner et al. |
| 7,537,352 B2 | 5/2009 | Chen |
| 7,854,514 B2 | 12/2010 | Conner et al. |
| 8,029,142 B2 | 10/2011 | Conner et al. |

(Continued)

FOREIGN PATENT DOCUMENTS

| JP | 200579104 A | 3/2005 |
| JP | 2006-337609 A | 12/2006 |
| WO | 2006124993 A1 | 11/2006 |

OTHER PUBLICATIONS

Communication issued on May 28, 2015 by the International Searching Authority in related Application No. PCT/KR2015/001548.

*Primary Examiner* — Sultan Chowdhury
*Assistant Examiner* — Danell L Owens
(74) *Attorney, Agent, or Firm* — Sughrue Mion, PLLC (57) ABSTRACT

Provided is a polarization light emitting diode (LED) module including: a casing comprising an opening; a light source configured to emit light; a reflective polarizer configured to transmit first polarized light of the light emitted from the light source through the opening of the casing toward an external polarization converter, and configured to reflect second polarized light of the light emitted from the light source toward the light source; and a reflector configured to reflect light, which is reflected from the reflective polarizer and traveling toward the light source, toward the reflective polarizer, wherein the light source, the reflective polarizer and the reflector are provided inside the casing.

25 Claims, 4 Drawing Sheets

(56) References Cited

U.S. PATENT DOCUMENTS

| | | |
|---|---|---|
| 8,267,528 B2 | 9/2012 | Conner et al. |
| 2005/0200812 A1* | 9/2005 | Sakata .................. H04N 9/315 |
| | | 353/20 |
| 2006/0114423 A1 | 6/2006 | Maeda et al. |
| 2006/0262514 A1 | 11/2006 | Conner et al. |
| 2007/0024809 A1 | 2/2007 | Takahashi et al. |
| 2009/0040465 A1 | 2/2009 | Conner et al. |
| 2009/0128781 A1 | 5/2009 | Li |
| 2011/0058145 A1 | 3/2011 | Conner et al. |
| 2012/0025220 A1 | 2/2012 | Conner et al. |
| 2013/0077283 A1* | 3/2013 | Li ........................ H04N 9/3167 |
| | | 362/19 |
| 2013/0188102 A1 | 7/2013 | Decusatis |
| 2013/0194556 A1 | 8/2013 | Chi et al. |

* cited by examiner

POLARIZATION LED MODULE, AND LIGHTING DEVICE AND PROJECTOR HAVING THE SAME

CROSS-REFERENCE TO RELATED APPLICATION

This application claims priority from Korean Patent Application No. 10-2014-0018251, filed on Feb. 18, 2014 in the Korean Intellectual Property Office, the disclosure of which is incorporated herein by reference.

BACKGROUND

Field

Apparatuses and methods consistent with exemplary embodiments relate to a polarization light emitting diode (LED) module in addition to a lighting device and a projector having the same, and more particularly to a polarization light emitting diode (LED) module, and a lighting device and a projector having the same, in which a light source and a reflective polarizer are integrated to reduce the size of the lighting device and have a simple structure.

Description of the Related Art

In the related art, a lighting device used in a projector includes a light source; a polarizing beam splitter (PBS) assembly for splitting light emitted from the light source into s-polarized light or p-polarized light; and a polarizing converter for converting polarized light split by the polarizing beam splitter assembly into certain polarized light, e.g. into s-polarized light or p-polarized light.

An extra high pressure mercury lamp, a metal haloid lamp, a xenon lamp, etc. have been commonly used as the light source, but a light emitting diode (LED), of which lifespan is longer and light conversion efficiency is higher than the extra high pressure mercury lamp and the like, has recently been increasingly employed.

However, the amount of light emitted from the LED is less than the amount of light emitted from the extra high pressure mercury lamp and the like. Since a projector is required to include a light source that emits a relatively large amount of light, a plurality of LEDs have been arranged in an array in order to increase the amount of light when the LED is used as the light source for the projector.

When the plurality of LEDs are arranged in an array, the amount of light increases in proportion to the number of LEDs. Further, when the array of LEDs is used for increasing the amount of light, the area (spatial area) of the light source also increases. As the area of the light source increases, a spatial area, in which a light beam entering from a lighting device to a spatial light modulator having a transmission-type liquid crystal display device of the projector, increases. However, it is difficult to effectively use the light beam from the light source with the increased spatial area because there is a limit with respect to an incident angle to the spatial light modulator. Therefore, it may be difficult to effectively use all the light flux from the light source because the spatial area, obtained by multiplying the area of the light source and a solid angle and where the effective light beam is present, i.e. Etendue, is remains constant even though the amount of light is increased by the array of LEDs.

In addition, a lighting device of the related art has a setback that the device is big and complicated because the light source and the polarizing beam splitter assembly are provided separately from each other.

Accordingly, a lighting device and a projector are required to not only increase an efficiency of brightness of light without increasing the Etendue when the plurality of LEDs as the light source are included but also decrease the size of the lighting device and simplify the structure of the lighting device.

SUMMARY

An aspect of an exemplary embodiment provides a polarization light emitting diode (LED) module, in which a light source and a reflective polarizer are integrated to reduce a device size and simplify a structure, and a lighting device and a projector having the same.

Another aspect of an exemplary embodiment is to provide a lighting device, in which light of high brightness is acquired by increasing an efficiency of using light without increasing Etendue when a plurality of polarization LED modules are included in the lighting device, and a projector having the same.

In accordance with an exemplary embodiment, there is provided a polarization light emitting diode (LED) module including: a casing configured to include an opening at one side thereof; a light source configured to be arranged inside the casing and emit light; a reflective polarizer configured to be arranged inside the casing, transmit first polarized light of the light emitted from the light source, to be guided toward an external polarization converter through the opening of the casing, and reflect second polarized light of the light emitted from the light source, to be guide toward the light source; and a reflector configured to be arranged inside the casing and reflect light, which is reflected from the reflective polarizer and traveling toward the light source, toward the reflective polarizer.

The opening of the casing may have the same shape as an incident surface of the external polarization converter.

The reflective polarizer may include a reflective polarization plate arranged perpendicularly to an optical axis and reflecting the second polarized light toward the light source.

Alternatively, the reflective polarizer may include at least one reflective polarization plate arranged at an angle of 45 degrees to an optical axis and reflecting the second polarized light toward a direction different from a side of the light source; and at least one mirror arranged at one side of the reflective polarization plate in parallel with the optical axis and reflecting the second polarized light, reflected from the reflective polarization plate, again toward the reflective polarization plate.

Also, the polarization LED module may further include a wavelength plate configured to be arranged in between the reflective polarizer and the reflector, and convert the second polarized light into the first polarized light when the second polarized light reflected from the reflective polarizer repetitively passes therethrough two or more times. In this case, the wavelength plate may be adjacent to the light source between the light source and the reflective polarizer, or arranged to the reflective polarizer between the light source and the reflective polarizer. Also, the wavelength plate may include a λ/4 wavelength plate.

The polarization LED module may further include a collimating lens arranged between the reflective polarizer and the light source and making light emitted from the light source into collimated light.

In accordance with another exemplary embodiment, there is provided a lighting device including: first and second polarization LED modules as described above and configured to emit light, and respectively convert first polarized light and second polarized light included in the emitted light into one of the first polarized light and the second polarized light and the other one of the first polarized light and the second polarized light; a polarized light synthesizer configured to transmit one of the first polarized light and the second polarized light converted by the first polarization LED module, and reflect the other one of the first polarized light and the second polarized light converted by the second polarization LED module so that the first polarized light and the second polarized light can be guided to an optical path of lighting direction; and a polarization converter configured to convert the first polarized light and the second polarized light guided to the optical path of one lighting direction into the first polarized light or the second polarized light.

The polarized light synthesizer may include a polarizing beam splitter or a reflective polarization plate, which may include a polarizing surface for transmitting the first polarized light and reflecting the second polarized light.

The polarization converter may include a transmission-type liquid crystal panel.

In accordance with other exemplary embodiment, there is provided a projector including: at least one lighting device as described above and configured to provide light converted from first polarized light and second polarized light of emitted light into first polarized light or second polarized light; a spatial light modulator configured to modulate light from the at least one lighting device in accordance with an image signal; and a projection lens configured to project the modulated light.

In accordance with an exemplary embodiment, there is provided a polarization light emitting diode (LED) module including: a casing including an opening; a light source configured to emit light; a reflective polarizer configured to transmit first polarized light of the light emitted from the light source through the opening of the casing toward an external polarization converter, and configured to reflect second polarized light of the light emitted from the light source toward the light source; and a reflector configured to reflect light, which is reflected from the reflective polarizer and traveling toward the light source, toward the reflective polarizer, wherein the light source, the reflective polarizer and the reflector are provided inside the casing.

A shape of the opening of the casing may be the same as a shape of an incident surface of the external polarization converter.

The reflective polarizer may include a reflective polarization plate arranged perpendicularly with respect to an optical axis and configured to reflect the second polarized light toward the light source.

The reflective polarizer may include: a reflective polarization plate arranged at an angle of 45 degrees with respect to an optical axis and configured to reflect the second polarized light toward a direction different from a direction toward the light source; and a mirror provided at an edge of the reflective polarization plate, extending in parallel with the optical axis and configured to reflect the reflected second polarized light by the reflective polarization plate toward the reflective polarization plate.

The polarization LED module may further include a wavelength plate provided between the reflective polarizer and the reflector and configured to convert the second polarized light into the first polarized light when the second polarized light reflected from the reflective polarizer repetitively passes through the wavelength plate.

The wavelength plate may be configured to convert the second polarized light into the first polarized light when the second polarized light reflected from the reflective polarizer repetitively passes through the wavelength plate at least two times.

The wavelength plate may be attached to the light source and provided between the light source and the reflective polarizer.

The wavelength plate may be attached to the reflective polarizer and provided between the light source and the reflective polarizer.

The wavelength plate may include a $\lambda/4$ wavelength plate.

The polarization LED module may further include a collimating lens arranged between the reflective polarizer and the light source and configured to change light emitted from the light source into collimated light.

The emitted light may include: first polarized light having a first oscillating direction; and second polarized light having a second oscillating direction.

The light source may include at least one LED.

The at least one LED may include a plurality of LEDs and the plurality of LEDs are arranged in an array.

In accordance with an exemplary embodiment, there is provided a lighting device including: a first polarization LED module according to claim 1 configured to convert first polarized light and second polarized light included in light from a first light source into the first polarized light and configured to emit the converted first polarized light; a second polarization LED module according to claim 1 configured to convert first polarized light and second polarized light included in light from a second light source into the second polarized light and configured to emit the converted second polarized light; a polarized light synthesizer configured to transmit one of the first polarized light from the first polarization LED module and the second polarized light from the second polarization LED module, configured to reflect the other one of the first polarized light from the first polarization LED module and the second polarized light from the second polarization LED module and configured to guide the first polarized light and the second polarized light to an optical path of a lighting direction; and a polarization converter configured to convert the guided first polarized light and the guided second polarized light into the first polarized light or the second polarized light.

The converted first polarized light and the converted second polarized light may have different oscillating directions from each other.

The polarized light synthesizer may include one of a polarizing beam splitter and a reflective polarization plate, the polarizing beam splitter and the reflective polarization plate including a polarizing surface configured to transmit one of the first and second polarized light and configured to reflect the other of the first and second polarized light.

The polarization converter may include a transmission-type liquid crystal panel.

In accordance with an exemplary embodiment, there is provided a projector including: a lighting device according to claim 14 configured to provide light converted from first polarized light and second polarized light of emitted light into the first polarized light or the second polarized light; a spatial light modulator configured to modulate the converted first or second polarized light from the lighting device in accordance with an image signal; and a projection lens configured to project the modulated light.

In accordance with an exemplary embodiment, there is provided a polarization light emitting diode (LED) module including: a casing including an opening; a plurality of light emitting diodes configured to emit light, the emitted light including: first polarized light having a first oscillating direction; and second polarized light having a second oscillating direction; a transreflective polarizer configured to transmit one of the first and second polarized light through the opening of the casing and configured to reflect the other of the first and second light of the light emitted from the light source toward the plurality of light emitting diodes; a light converting plate configured to convert the other of the first and second light reflected by the transreflective polarizer when the other of the first and second light reflected by the transreflective polarizer repetitively passes through the wavelength plate; and a reflector configured to reflect light, which is reflected from the transreflective polarizer and traveling toward the plurality of light emitting diodes, toward the transreflective polarizer, wherein the plurality of light emitting diodes, the transreflective polarizer and the reflector are provided inside the casing.

A shape of the opening of the casing may be the same as a shape of an incident surface of the external polarization converter.

The light converting plate may be attached to the plurality of light emitting diodes and provided between the plurality of light emitting diodes and the transreflective polarizer.

The light converting plate may be attached to the transreflective polarizer and provided between the plurality of light emitting diodes and the transreflective polarizer.

The polarization LED module may further include a collimating lens arranged between the transreflective polarizer and the plurality of light emitting diodes and configured to change light emitted from the light source into collimated light.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, a polarization light emitting diode (LED) module, and a lighting device and a projector having the same, according to exemplary embodiments will be described with reference to accompanying drawings.

Figure 1:
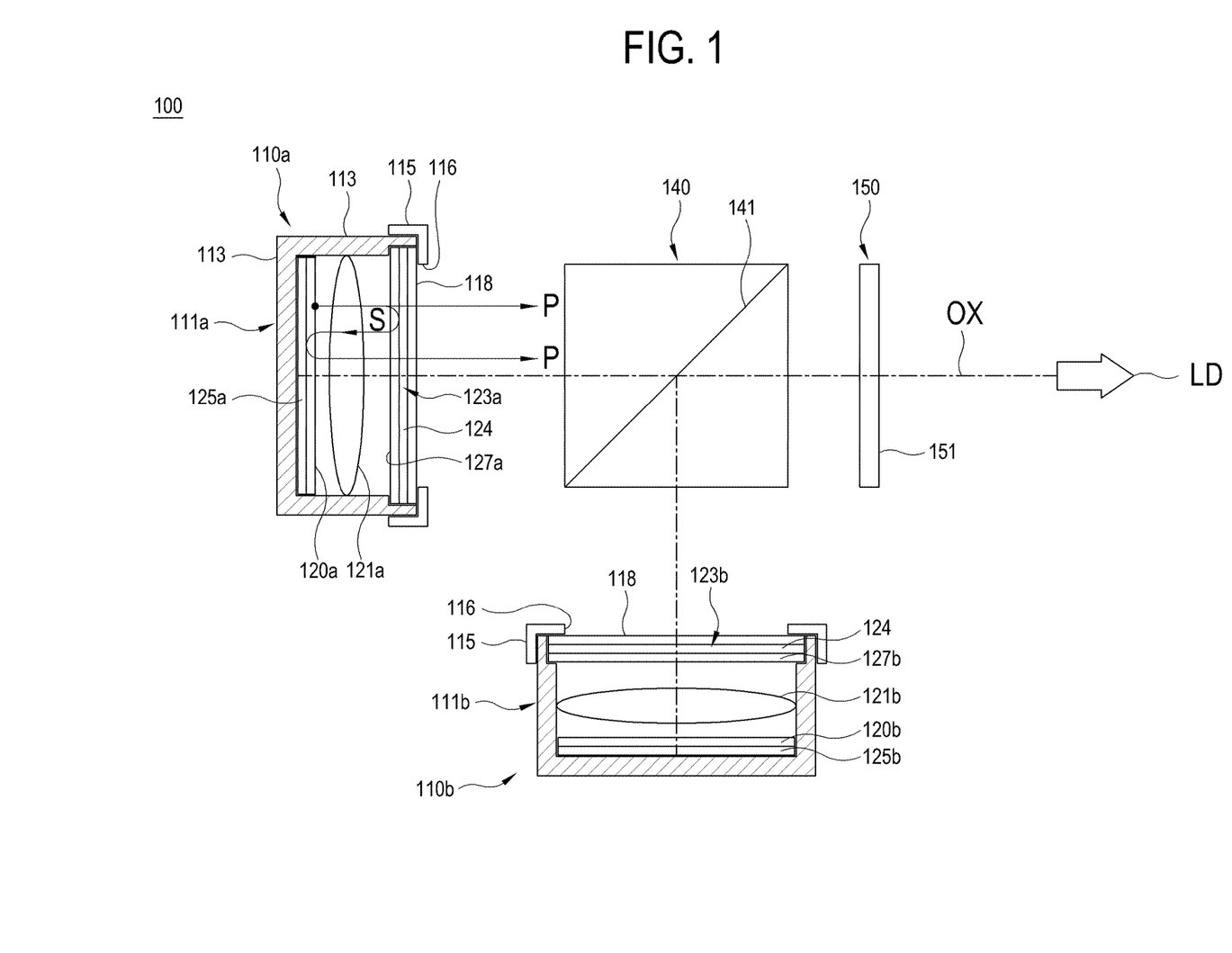
FIG. 1 is a schematic view showing a lighting device provided with a polarization light emitting diode (LED) module according to an exemplary embodiment.

FIG. 1 is a schematic view showing a lighting device 100 provided with a polarization LED module according to an exemplary embodiment.

As a lighting device used for a projector, the lighting device 100 includes a first polarization LED module 110a, a second polarization LED module 110b, a polarized light synthesizer 140, and a polarization converter 150.

The first polarization LED module 110a makes polarized light having a first oscillating direction in a first wavelength region, for example, p-polarized light P of green light. To this end, the first polarization LED module 110a includes a first casing 111a, a first light source 120a, a first collimating lens 121a, a first reflective polarizer 123a, a first reflector 125a and a first wavelength plate 127a.

The first casing 111a includes a body 113 and a cover glass 118. The body 113 is formed to have a rectangular parallelepiped shape opened at one side thereof. The cover glass 118 is fastened to the one opened side (i.e. a right side in FIG. 1) of the body 113 by a cover fastener 115 formed with an opening 116 so as to seal up the opened side of the body 113.

To prevent loss of a light beam emitted from the first polarization LED module 110, the opening 116 of the cover fastener 115 is formed to have the same shape as a shape of an incident surface of a transmission-type liquid crystal panel 151 of the polarization converter 150 (to be described later), for example, a rectangular shape of 4:3 or 16:9 ratio between adjacent edges.

The first light source 120a is arranged at a closed side (i.e. a left side in FIG. 1) opposite from the opened side including the opening 116 of the body 113 within the body 113 of the first casing 111a, and emits light of the first wavelength region, i.e., the green light.

In the exemplary embodiment, the first light source 120a may be an LED chip provided with at least one green LED.

The first collimating lens 121a is arranged in between the first light source 120a and the first wavelength plate 127a within the body 113 of the first casing 111a. The first collimating lens 121a is arranged substantially perpendicularly to an optical axis OX and outputs collimated light by converting the green light incident from the first light source 120a.

The first reflective polarizer 123a includes a reflective polarization plate 124 arranged in between the cover glass 118 and the first wavelength plate 127a within the body 113 of the first casing 111a. The reflective polarization plate 124 is arranged perpendicularly to the optical axis OX, and transmits the polarized light having the first oscillating direction, for example, the p-polarized light P included in the collimated light incident from the first collimating lens 121a, to be guided in a lighting direction LD outside the first casing 111a, but reflect polarized light having a different second oscillating direction, for example, s-polarized light S, included in the collimated light, to be guided back toward the first light source 120a. That is, the first reflective polarizer 123a has a transreflective property and both transmits and reflects light.

In the exemplary embodiment, the reflective polarization plate 124 may be a wire grid type polarization plate in which a wire made of metal, for example, aluminum is installed in the form of a grid onto a substrate made of optically transparent glass member. The wire grid type polarization plate transmits light polarized to have an oscillating direction perpendicular to the metal wire, but reflects light polarized to have an oscillating direction parallel to the wire. In the exemplary embodiment, the wire grid type polarization plate is installed while arranging the metal wire to be perpendicular to the oscillating direction of the p-polarized light P so as to transmit the polarized light having the first oscillating direction, for example, the p-polarized light P.

The first reflector 125a is arranged between the closed side of the body 113 and the first light source 120a within the body 113 of the first casing 111a, so that a light beam reflected from the first reflective polarizer 123a and traveling back toward the first light source 120a can be returned toward the first reflective polarizer 123a. The first reflector 125a may be achieved by a reflective substrate having a lead frame or the like for supplying electric power to a green LED chip of the first light source 120a.

The first wavelength plate 127a is attached to a side of the first reflective polarizer 123a facing the first light source 120a between the first collimating lens 121a and the first reflective polarizer 123a by an optically transparent adhesive. The first wavelength plate 127a converts the s-polarized light S into the p-polarized light P when out of the light beam exiting from the first light source 120a and firstly transmitted through the first wavelength plate 127a, the s-polarized light S reflected toward the first light source 120a by the first reflective polarizer 123a and secondly transmitted through the first wavelength plate 127a is reflected by the first reflector 125a and thirdly transmitted through the first wavelength plate 127a as shown in FIG. 1. If absorption and loss of the light beam are not taken into account, the light beam repetitively reflected from the first wavelength plate 127a is entirely converted into the p-polarized light P and exits toward the first reflective polarization plate 124. Thus, it is possible to maximize the efficiency of using the light.

In the examplary embodiment, the first wavelength plate 127a may be a λ/4 wavelength plate.

Thus, the first polarization LED module 110a not only emits the p-polarized light P included in the light beam exiting from the first light source 120a but also emits the p-polarized light P converted from the s-polarized light S included in the light beam exiting from the first light source 120a, thereby having a high efficiency of using the light beam from the first light source 120a.

In the first polarization LED module 110a, the first light source 120a, the first collimating lens 121a, the first reflective polarizer 123a, the first reflector 125a, the first wavelength plate 127a, etc. are integrated within the first casing 111a, so that the lighting device 100 can be decreased in size and have a simplified structure.

The second polarization LED module 110b makes polarized light having a second oscillating direction in the first wavelength region, for example, s-polarized light S of green light. To this end, the second polarization LED module 110b includes a second casing 111b, a second light source 120b, a second collimating lens 121b, a second reflective polarizer 123b, a second reflector 125b and a second wavelength plate 127b.

The second polarization LED module 110b is the same as the first polarization LED module 110a except that the second collimating lens 121b transmit the polarized light of the second oscillating direction, i.e. the s-polarized light S to be guided in the lighting direction LD outside the second casing 111b but reflect the polarized light having the first oscillating direction, i.e. the p-polarized light P to be guided back toward the second light source 120b, and that the second wavelength plate 127b converts the p-polarized light P into the s-polarized light S.

The first light source 120a of the first polarization LED module 110a and the second light source 120b of the second polarization LED module 110b are arranged at optically equivalent positions when the lighting device 100 is viewed from the lighting direction LD.

Further, the first light source 120a of the first polarization LED module 110a and the second light source 120b of the second polarization LED module 110b may be alternately driven in a predetermined cycle.

The polarized light synthesizer 140 transmits the p-polarized light P incident from the first polarization LED module 110a and reflects the s-polarized light S incident from the second polarization LED module 110b, thereby allowing the p-polarized light P and the s-polarized light S to be synthesized and guided in the lighting direction LD. Thus, the polarized light synthesizer 140 guides the light beams from the first and second polarization LED modules 110a and 110b in one or the same optical path of the lighting direction LD without increasing Etendue.

In the exemplary embodiment, the polarized light synthesizer 140 may be a polarizing beam splitter having a polarizing surface 141 formed at an angle of about 45° to the optical axis OX. The polarizing surface 141 transmits the p-polarized light but reflects the s-polarized light. Therefore, the p-polarized light P incident from the first polarization LED module 110a passes through the polarized light synthesizer 140 and exits in a lighting direction LD. Further, the s-polarized light S incident from the second polarization LED module 110b is reflected by the polarized light synthesizer 140 and exits in the lighting direction LD.

However, the exemplary embodiment is not limited thereto. For example, the polarized light synthesizer 140 may be a reflective polarization plate such as a polarization plate made of metal, for example, aluminum, instead of the polarizing beam splitter.

The polarization converter 150 may be, for example, a polarization converter for green light, which may modulate and emit the p-polarized light and the s-polarized light incident from the polarized light synthesizer 140 in accordance with input signals. In the exemplary embodiment, the polarization converter 150 may be a transmission-type liquid crystal panel 151.

Thus, the lighting device 100 according to the exemplary embodiment can increase the amount of light without increasing the Etendue since the polarized light synthesizer 140 guides the light beams from the first and second polarization LED modules 110a and 110b in one optical path of the lighting direction LD.

Further, the lighting device 100 according to the exemplary embodiment is decreased in size and has a simplified structure because the first and second polarization LED modules 110a and 110b are respectively achieved by integrating the first and second light sources 120a and 120b, the first and second collimating lenses 121a and 121b, the first and second reflective polarizers 123a and 123b, the first and second reflectors 125a and 125b, and the first and second wavelength plates 127a and 127b, etc. within the first and second casings 111a and 111b.

In the foregoing lighting device 100, the first and second reflective polarizers 123a and 123b may be the reflective polarization plate 124 arranged in between the cover glass 118 and the first wavelength plate 127a, but the exemplary embodiment is not limited thereto.

Figure 2:
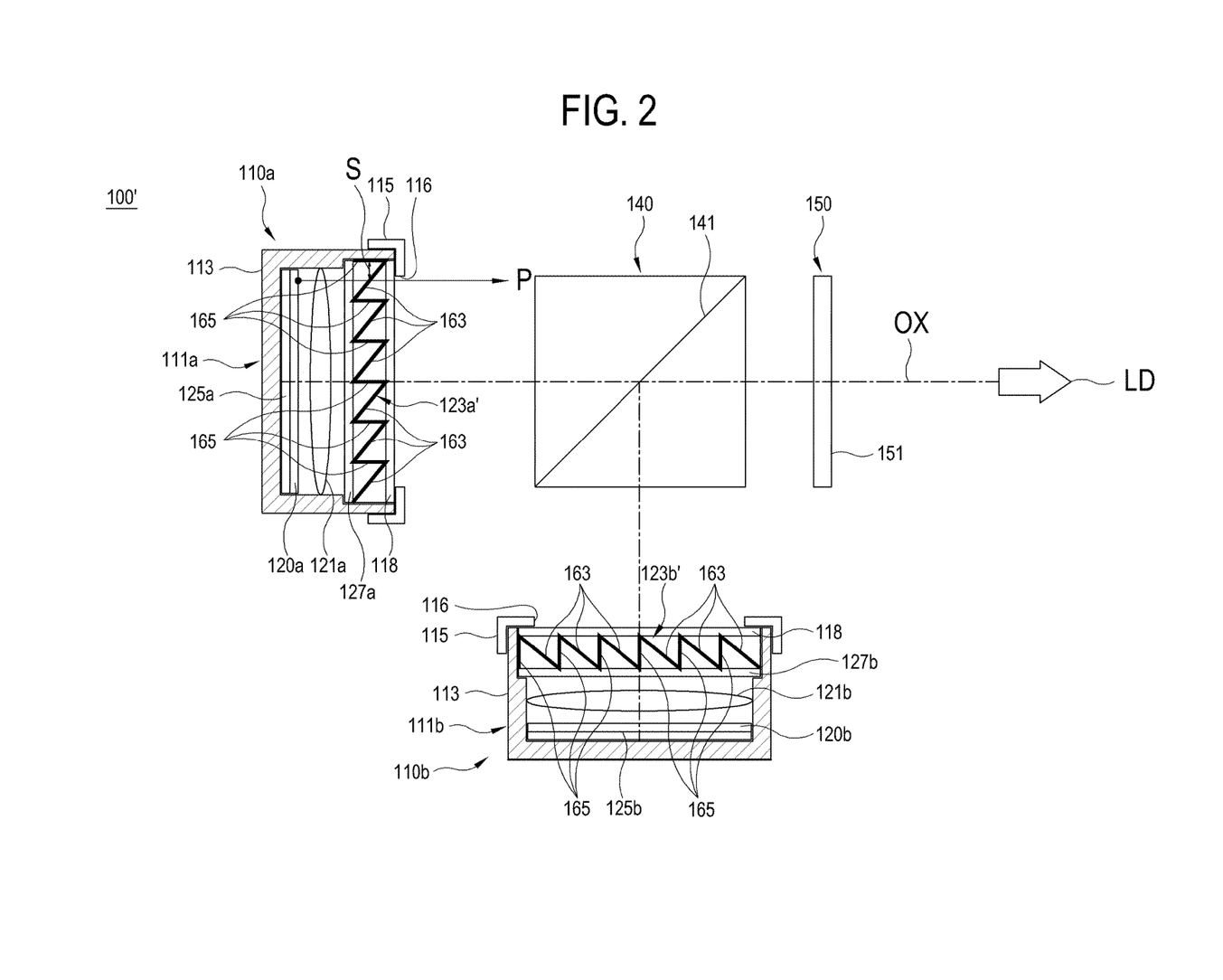
FIG. 2 is a schematic view showing a polarization LED module in a lighting device according to another exemplary embodiment.

For example, as shown in FIG. 2, first and second reflective polarizers 123a' and 123b' of the lighting device 100 may respectively include at least one reflective polarization plate 163 and at least one mirror 165.

At least one reflective polarization plate 163 in the first reflective polarizer 123a' may be arranged at an angle of about 45 degrees with respect to the optical axis OX. At least one reflective polarization plate 163 transmits the p-polarized light P or the s-polarized light S included in the collimated light incident from the first collimating lens 121a and firstly transmitted through the first wavelength plates 127a, to be guided in the lighting direction LD through the polarized light synthesizer 140, and reflects the s-polarized light S or the p-polarized light P included in the collimated light to be guided back toward the first light source 120a.

At least one mirror 165 in the first reflective polarizer 123a' may be arranged in parallel with the optical axis OX at least at one edge of the reflective polarization plate 163 and returns the s-polarized light or the p-polarized light reflected by the reflective polarization plate 163 toward the reflective polarization plate 163 again as shown in FIG. 2.

The reflective polarization plate 163 allows the s-polarized light or p-polarized light incident again, to be reflected toward the first reflector 125a through the first light sources 120a while secondly transmitting the first wavelength plate 127a by the reflective polarization plate 163. The s-polarized light or the p-polarized light incident to the first reflector 125a is converted into the p-polarized light P or the s-polarized light S by being reflected from the first reflector 125a and thirdly transmitting the first wavelength plate 127a. The converted p-polarized light P or s-polarized light S transmits the reflective polarization plate 163 and is then projected toward the lighting direction LD through the polarized light synthesizer 140.

Similarly, at least one reflective polarization plate 163 in the second reflective polarizer 123b' may be arranged at an angle of about 45 degrees with respect to the optical axis OX. At least one reflective polarization plate 163 transmits the p-polarized light P or the s-polarized light S included in the collimated light incident from the second collimating lens 121b and firstly transmitted through the second wavelength plates 127b, to be guided in the lighting direction LD through the polarized light synthesizer 140, and reflects the s-polarized light S or the p-polarized light P included in the collimated light to be guided back toward the second light source 120b.

At least one mirror 165 in the second reflective polarizer 123b' is arranged in parallel with the optical axis OX at least at one edge of the reflective polarization plate 163 and returns the s-polarized light or the p-polarized light reflected by the reflective polarization plate 163 toward the reflective polarization plate 163 again as shown in FIG. 2. The reflective polarization plate 163 allows the s-polarized light or p-polarized light incident again, to be reflected toward the second reflector 125b through the second light sources 120b while secondly transmitting the second wavelength plate 127b by the reflective polarization plate 163. The s-polarized light or the p-polarized light incident to the second reflector 125b is converted into the p-polarized light P or the s-polarized light S by being reflected from the second reflector 125b and thirdly transmitting the second wavelength plate 127b. The converted p-polarized light P or s-polarized light S transmits the reflective polarization plate 163 and is then projected toward the lighting direction LD through the polarized light synthesizer 140.

Further, in the lighting device 100 according to the exemplary embodiment, the first and second wavelength plate 127a and 127b of the first and second polarization LED modules 110a and 110b are attached to sides of the first and second reflective polarizers 123a and 123b facing the first and second light sources 120a and 120a between the first and second collimating lenses 121a and 121b and the first and second reflective polarizers 123a and 123b, respectively, but the exemplary embodiment is not limited thereto.

Figure 3:
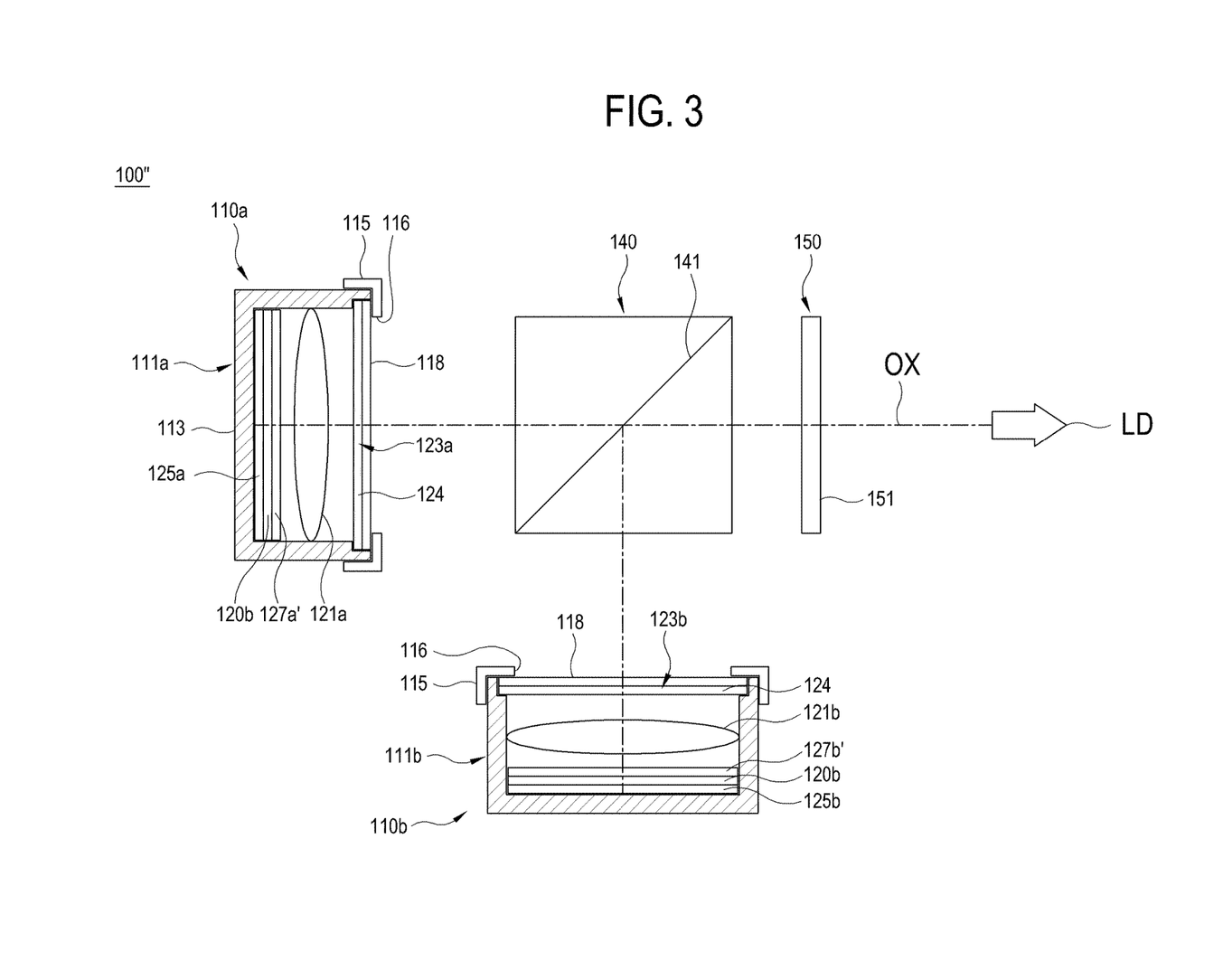
FIG. 3 is a schematic view showing a polarization LED module in a lighting device according to yet another exemplary embodiment.

For example, as shown in FIG. 3, the first and second wavelength plates 127a' and 127b' of the lighting device 100" may be adjacent to the first and second light sources 120a and 120b between the first and second light sources 120a and 120b and the first and second collimating lenses 121a and 121b, respectively.

Further, in the foregoing lighting device 100 according to an exemplary embodiment, the first and second polarization LED modules 110a and 110b are respectively provided with both the first and second collimating lenses 121a and 121b and the first and second wavelength plates 127a and 127b, but the exemplary embodiment is not limited thereto. For example, the first and second collimating lenses 121a and 121b and/or the first and second wavelength plates 127a and 127b may be omitted in accordance with design even though the efficiency of the polarizing conversion is lowered when they are not used.

Figure 4:
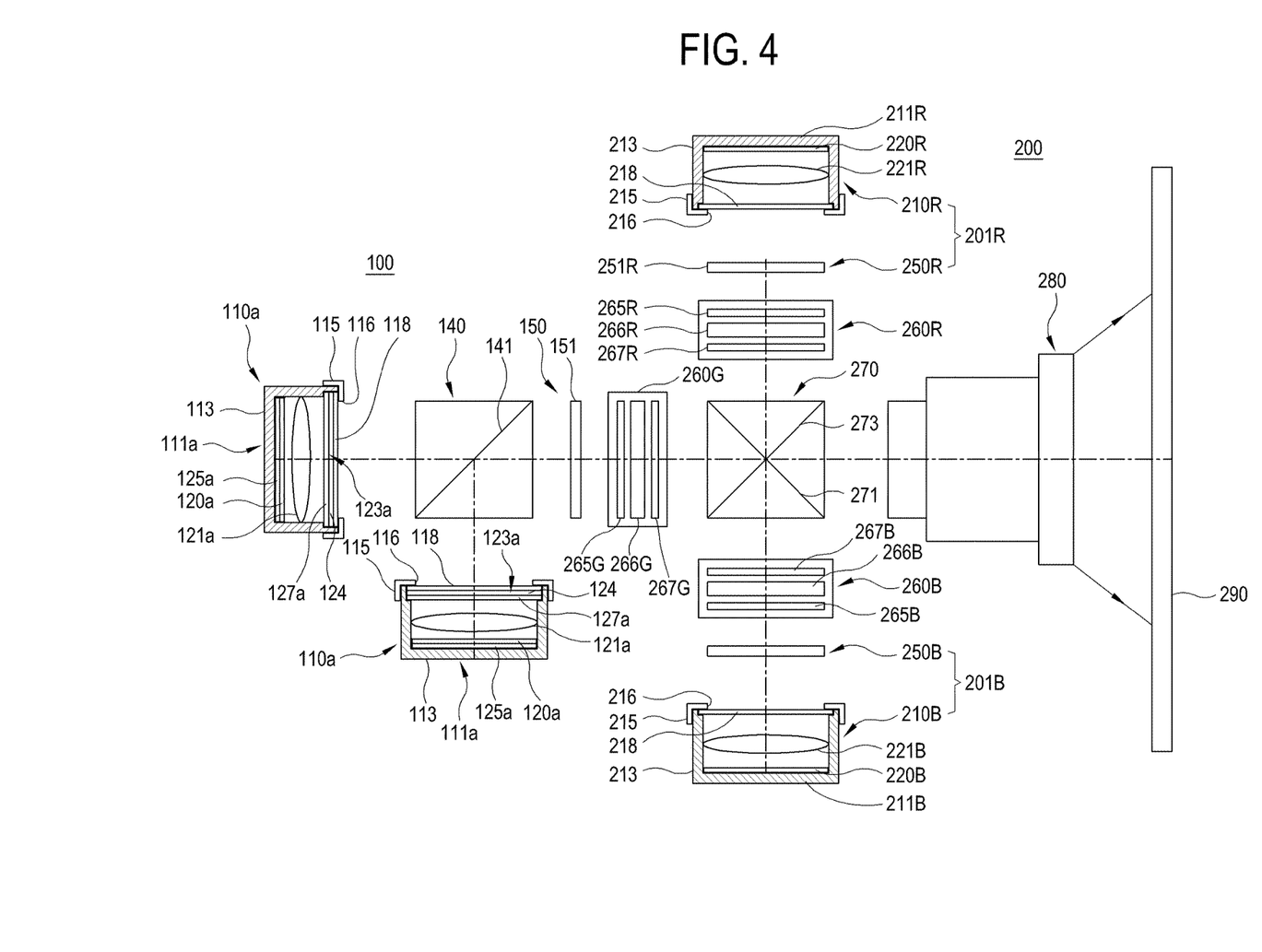
FIG. 4 is a schematic view showing a projector having a lighting device according to an exemplary embodiment.

FIG. 4 is a schematic view showing a projector 200 having the lighting device 100 according to an exemplary embodiment.

The projector 200 includes a first lighting device 201R, a spatial light modulator 260R for red light, a second lighting device 100, a spatial light modulator 260G for green light, a third lighting device 201B, a spatial light modulator 260B, a cross dichroic prism 270, a projection lens 280, and a screen 290.

The first lighting device 201R provides first colored light, i.e. red light, and includes a red LED module 210R, and a red-light polarization converter 250R.

The red LED module 210R includes a red light casing 211R, a red light source 220R, and a red-light collimating lens 221R.

The red light casing 211R includes a body 213 and a cover glass 218. The body 213 is formed to have a rectangular parallelepiped shape opened at one side thereof (at a lower side of FIG. 4). The cover glass 218 is fastened to an open-side of the body 213 by a cover fastener 215 formed with an opening 216 so as to seal up the one opened-side of the body 213.

To prevent loss of a light beam emitted from the red LED module 210R, the opening 216 of the cover fastener 215 is formed to have the same shape as a shape of an incident surface of the red-light polarization converter 250R (to be described later), for example, a rectangular shape of 4:3 or 16:9.

The red light source 220R emits light of the second wavelength region, i.e. red right. In this exemplary embodiment, the red light source 220R may be an LED chip provided with at least one red LED.

The red collimating lens 221R is arranged between the red light source 220R and the cover glass 218 within the body 213 of the red light casing 211R. The red collimating lens 221R is arranged perpendicularly to an optical axis OX and outputs collimated light by converting the red light incident from the red light source 220R.

The red-light polarization converter 250R converts the red light incident from the red collimating lens 221R into polarized light, for example, p-polarized light, having a certain oscillating direction. In the exemplary embodiment, the red-light polarization converter 250R may be a transmission-type liquid crystal panel 251R.

The polarized red light enters a spatial light modulation device for red light. In the examplary embodiment, the spatial light modulation device may be a spatial light modulator 260R.

The spatial light modulator 260R for the red light may be a transmission-type liquid crystal display device that modulates red light in accordance with an image signal. The spatial light modulator 260R for the red light includes a liquid crystal panel 265R, a first polarization plate 266R, and a second polarization plate 267R.

The first polarization plate 266R transmits the red light converted into the p-polarized light incident to the liquid crystal panel 265R. The liquid crystal panel 265R modulates the p-polarized light in accordance with an image signal, and converts the modulated p-polarized light into the s-polarized light. The second polarization plate 267R outputs the red light that is converted into the s-polarized light in the liquid crystal panel 265R.

Thus, the spatial light modulator 260R for the red light modulates the red light from the first lighting device 201R.

The red light converted into the s-polarized light in the spatial light modulator 260R for the red light is incident to the cross dichroic prism 270.

The second lighting device 100 provides second colored light, i.e. green light, and is the same as the lighting device 100 described with reference to FIG. 1.

The green light projected from the second lighting device 100 is converted into the light polarized to have a certain oscillating direction by a polarization converter 260G of the green-light lighting device 100, for example, into the s-polarized light, and then incident to the spatial light modulation device for the second colored light, i.e. to a spatial light modulator 260G for the green light.

The green-light spatial light modulator 260G is a transmission-type liquid crystal display device that modulates green light in accordance with an image signal, and includes a liquid crystal panel 265G, a first polarization plate 266G, and a second polarization plate 267G.

The first polarization plate 266G transmits the green light converted into the s-polarized light to be incident to the liquid crystal panel 265G. The liquid crystal panel 265G modulates the s-polarized light in accordance with an image signal and converts the modulated s-polarized light into the p-polarized light. The second polarization plate 267G transmits the green light that is converted into the p-polarized light in the liquid crystal panel 265G.

Thus, the green-light spatial light modulator 260G modulates the green light from the second light source 100. The green light converted into the p-polarized light in the green-light spatial light modulator 260G is incident to the cross dichroic prism 270.

A third lighting device 201B provides a third colored light, i.e. blue light, and includes a blue LED module 210B, and a blue-light polarization converter 250B.

The blue LED module 210B includes a blue light casing 211B, a blue light source 220B, and a blue collimating lens 221B.

The blue light casing 211B includes a body 213 and a cover glass 218. The body 213 is formed to have a rectangular parallelepiped shape opened at one side thereof (i.e. an upper side in FIG. 4). The cover glass 218 is fastened to an open-side of the body 213 by a cover fastener 215 formed with an opening 216 so as to seal up the one opened-side of the body 113.

To prevent loss of a light beam emitted from the blue polarization LED module 210B, the opening 216 of the cover fastener 215 is formed to have the same shape as a shape of an incident surface of a blue light polarization converter 250B (to be described later), for example, a rectangular shape of 4:3 or 16:9.

The blue light source 220B emits light of a third wavelength region, i.e. blue light. In this exemplary embodiment, the blue light source 220B may be achieved by an LED chip provided with at least one blue LED.

The blue collimating lens 221B is arranged in between the blue light source 220B and the cover glass 218 within the body 213 of the blue casing 211B. The blue collimating lens 221B is arranged perpendicularly to an optical axis OX and outputs collimated light by converting the blue light incident from the blue light source 220B.

The blue-light polarization converter 250B converts the blue light incident from the blue collimating lens 221B into polarized light having a certain oscillating direction, e.g., into the p-polarized light. In this exemplary embodiment, the blue-light polarization converter 250B may be achieved by a transmission-type liquid crystal panel 251B.

The polarized blue light is incident to a spatial light modulation device for the blue colored light, i.e. a spatial light modulator 260B for the blue light.

The blue-light spatial light modulator 260B is a transmission-type liquid crystal display device that modulates blue light in accordance with an image signal, and includes a liquid crystal panel 265B, a first polarization plate 266B, and a second polarization plate 267B.

The first polarization plate 266B transmits the blue light converted into the p-polarized light to be incident to the liquid crystal panel 265B. The liquid crystal panel 265B modulates the p-polarized light in accordance with an image signal and converts the modulated p-polarized light into the s-polarized light. The second polarization plate 267B transmits the blue light that is converted into the s-polarized light in the liquid crystal panel 265B.

Thus, the blue-light spatial light modulator 260B modulates the blue light from the third lighting device 201B. The blue light converted into the s-polarized light in the blue-light spatial light modulator 260B is incident to the cross dichroic prism 270.

The cross dichroic prism 270 includes first and second dichroic films 271 and 273. The first and second dichroic films 271 and 273 are orthogonally arranged in the form of 'X' as shown in FIG. 4. The first dichroic film 271 reflects the s-polarized light, i.e. the red light, and transmits the p-polarized light, i.e. the green light. The second dichroic film 273b reflects the s-polarized light, i.e. the blue light, and transmits the p-polarized light, i.e. the green light. Thus, the cross dichroic prism 270 synthesizes the red light, the green light and the blue light respectively modulated by the red-light spatial light modulator 260R, the green-light spatial light modulator 260G, and the blue-light spatial light modulator 260B.

The projection lens 280 projects the light synthesized by the cross dichroic prism 270 to the screen 290.

As described above, the projector 200 according to an exemplary embodiment can acquire a good projection image which is bright and has high-quality because the projector 200 employs the second lighting device 100 which increases an efficiency of using light and emits light of high brightness.

In particular, there is a need of increasing the amount of green light beam by 60% to 80% with regard to the entire amount of light beam in order to acquire a generally-white projection image by projecting red light, green light and blue light. To this end, the projector 200 according to an exemplary embodiment is configured to include the light sources 120a and 120b of the second lighting device 100, which are one more than the red light source 220R of the first lighting device 201R or the blue light source 220B of the third lighting device 201B, and alternately operate in a predetermined cycle. As a result, the amount of green light from the second lighting device 100 is larger than the amount of red light from the first lighting device 201R or the amount of blue light from the third lighting device 201B.

Further, the second lighting device 100 acquires light of high brightness without increasing the Etendue about green light since the polarized light synthesizer 140 synthesizes the light beams from the first and second light sources 120a and 120b to be guided to the one optical path of lighting direction LD. As a result, it is possible to get a good projection image.

Further, the second lighting device 100 is decreased in size and has a simplified structure because the first and second polarization LED modules 110a and 110b are respectively achieved by integrating the first and second light sources 120a and 120b, the first and second collimating lenses 121a and 121b, the first and second reflective polarizers 123a and 123b, the first and second reflectors 125a and 125b, the first and second wavelength plates 127a and 127b, etc. within the first and second casings 111a and 111b.

Although exemplary embodiments have been shown and described above, it will be appreciated by those skilled in the art that various changes may be made therein without departing from the principles and spirit of the inventive concept as defined by the following claims.

What is claimed is:

1. A polarization light emitting diode (LED) module comprising:
    a casing comprising an opening;
    a light source configured to emit light;
    a reflective polarizer configured to transmit first polarized light of the light emitted from the light source through the opening of the casing toward an external polarization converter, and configured to reflect second polarized light of the light emitted from the light source toward the light source;
    a reflector configured to reflect light, which is reflected from the reflective polarizer and traveling toward the light source, toward the reflective polarizer; and
    a wavelength plate provided between the reflective polarizer and the reflector and configured to convert the second polarized light into the first polarized light when the second polarized light reflected from the reflective polarizer repetitively passes through the wavelength plate,
    wherein the light source, the reflective polarizer, the reflector, and the wavelength plate are provided inside the casing.

2. The polarization LED module according to claim 1, wherein a shape of the opening of the casing is the same as a shape of an incident surface of the external polarization converter.

3. The polarization LED module according to claim 1, wherein the reflective polarizer comprises a reflective polarization plate arranged perpendicularly with respect to an optical axis and configured to reflect the second polarized light toward the light source.

4. The polarization LED module according to claim 1, wherein the reflective polarizer comprises:
    a reflective polarization plate arranged at an angle of 45 degrees with respect to an optical axis and configured to reflect the second polarized light toward a direction different from a direction toward the light source; and
    a mirror provided at an edge of the reflective polarization plate, extending in parallel with the optical axis and configured to reflect the reflected second polarized light by the reflective polarization plate toward the reflective polarization plate.

5. The polarization LED module according to claim 1, wherein the wavelength plate is configured to convert the second polarized light into the first polarized light when the second polarized light reflected from the reflective polarizer repetitively passes through the wavelength plate at least two times.

6. The polarization LED module according to claim 1, wherein the wavelength plate is attached to the light source and provided between the light source and the reflective polarizer.

7. The polarization LED module according to claim 1, wherein the wavelength plate is attached to the reflective polarizer and provided between the light source and the reflective polarizer.

8. The polarization LED module according to claim 1, wherein the wavelength plate comprises a $\lambda/4$ wavelength plate.

9. The polarization LED module according to claim 1 further comprising a collimating lens arranged between the reflective polarizer and the light source and configured to change light emitted from the light source into collimated light.

10. The polarization LED module according to claim 1, wherein the emitted light comprises:
    first polarized light having a first oscillating direction; and
    second polarized light having a second oscillating direction.

11. The polarization LED module according to claim 1, wherein the light source comprises at least one LED.

12. The polarization LED module according to claim 11, wherein the at least one LED comprises a plurality of LEDs and the plurality of LEDs are arranged in an array.

13. A lighting device comprising:
    a first polarization LED module according to claim 1 configured to convert first polarized light and second polarized light included in light from a first light source into the first polarized light and configured to emit the converted first polarized light;
    a second polarization LED module according to claim 1 configured to convert first polarized light and second polarized light included in light from a second light source into the second polarized light and configured to emit the converted second polarized light;
    a polarized light synthesizer configured to transmit one of the first polarized light from the first polarization LED module and the second polarized light from the second polarization LED module, configured to reflect the other one of the first polarized light from the first polarization LED module and the second polarized light from the second polarization LED module and configured to guide the first polarized light and the second polarized light to an optical path of a lighting direction; and
    a polarization converter configured to convert the guided first polarized light and the guided second polarized light into the first polarized light or the second polarized light.

14. The lighting device according to claim 13, wherein the converted first polarized light and the converted second polarized light have different oscillating directions from each other.

15. The lighting device according to claim 13, wherein the polarized light synthesizer comprises one of a polarizing beam splitter and a reflective polarization plate, the polarizing beam splitter and the reflective polarization plate comprising a polarizing surface configured to transmit one of the first and second polarized light and configured to reflect the other of the first and second polarized light.

16. The lighting device according to claim 13, wherein the polarization converter comprises a transmission-type liquid crystal panel.

17. A projector comprising:
    a lighting device according to claim 13 configured to provide light converted from first polarized light and second polarized light of emitted light into the first polarized light or the second polarized light;
    a spatial light modulator configured to modulate the converted first or second polarized light from the lighting device in accordance with an image signal; and
    a projection lens configured to project the modulated light.

18. A polarization light emitting diode (LED) module comprising:
- a casing comprising an opening;
- a plurality of light emitting diodes configured to emit light, the emitted light comprising:
  - first polarized light having a first oscillating direction; and
  - second polarized light having a second oscillating direction;
- a transreflective polarizer configured to transmit one of the first and second polarized light through the opening of the casing and configured to reflect the other of the first and second light of the light emitted from the light source toward the plurality of light emitting diodes;
- a reflector configured to reflect light, which is reflected from the transreflective polarizer and traveling toward the plurality of light emitting diodes, toward the transreflective polarizer; and
- a wavelength plate provided between the transreflective polarizer and the reflector and configured to convert the other of the first and second light second polarized light into the one of the first and second light second polarized light when the other of the first and second light reflected by the transreflective polarizer repetitively passes through the wavelength plate,
- wherein the plurality of light emitting diodes, the transreflective polarizer, the reflector, and the wavelength plate are provided inside the casing.

19. The polarization LED module according to claim 18, wherein a shape of the opening of the casing is the same as a shape of an incident surface of the external polarization converter.

20. The polarization LED module according to claim 18, wherein the wavelength plate is attached to the plurality of light emitting diodes and provided between the plurality of light emitting diodes and the transreflective polarizer.

21. The polarization LED module according to claim 18, wherein the wavelength plate is attached to the transreflective polarizer and provided between the plurality of light emitting diodes and the transreflective polarizer.

22. The polarization LED module according to claim 18 further comprising a collimating lens arranged between the transreflective polarizer and the plurality of light emitting diodes and configured to change light emitted from the light source into collimated light.

23. A lighting device comprising:
- a first polarization LED module according to claim 18 configured to convert first polarized light and second polarized light included in light from a first light source into the first polarized light and configured to emit the converted first polarized light;
- a second polarization LED module according to claim 18 configured to convert first polarized light and second polarized light included in light from a second light source into the second polarized light and configured to emit the converted second polarized light;
- a polarized light synthesizer configured to transmit one of the first polarized light from the first polarization LED module and the second polarized light from the second polarization LED module, configured to reflect the other one of the first polarized light from the first polarization LED module and the second polarized light from the second polarization LED module and configured to guide the first polarized light and the second polarized light to an optical path of a lighting direction; and
- a polarization converter configured to convert the guided first polarized light and the guided second polarized light into the first polarized light or the second polarized light.

24. The lighting device according to claim 23, wherein the converted first polarized light and the converted second polarized light have different oscillating directions from each other.

25. A projector comprising:
- a lighting device according to claim 23 configured to provide light converted from first polarized light and second polarized light of emitted light into the first polarized light or the second polarized light;
- a spatial light modulator configured to modulate the converted first or second polarized light from the lighting device in accordance with an image signal; and
- a projection lens configured to project the modulated light.

* * * * *